US010209551B2

(12) United States Patent
Lin et al.

(10) Patent No.: US 10,209,551 B2
(45) Date of Patent: Feb. 19, 2019

(54) DUAL-LOOP DISPLAY SENSING FOR COMPENSATION

(71) Applicant: Apple Inc., Cupertino, CA (US)

(72) Inventors: Hung Sheng Lin, San Jose, CA (US); Jesse A. Richmond, San Francisco, CA (US); Mohammad B. Vahid Far, San Jose, CA (US); Tobias Jung, San Francisco, CA (US); Jie Won Ryu, Campbell, CA (US); Hyunwoo Nho, Stanford, CA (US); Kingsuk Brahma, Mountain View, CA (US); Sun-Il Chang, San Jose, CA (US); Junhua Tan, Santa Clara, CA (US); Marc Albrecht, San Francisco, CA (US); Chih-Wei Yeh, Campbell, CA (US); Chaohao Wang, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/677,267

(22) Filed: Aug. 15, 2017

(65) Prior Publication Data

US 2018/0081234 A1    Mar. 22, 2018

Related U.S. Application Data

(60) Provisional application No. 62/396,538, filed on Sep. 19, 2016.

(51) Int. Cl.
*G02F 1/1333* (2006.01)
*G09G 3/20* (2006.01)
*G09G 3/36* (2006.01)
*G09G 3/3233* (2016.01)

(52) U.S. Cl.
CPC ..... *G02F 1/133385* (2013.01); *G09G 3/2048* (2013.01); *G09G 3/3233* (2013.01); *G09G 3/3633* (2013.01); *G09G 2320/029* (2013.01); *G09G 2320/0233* (2013.01); *G09G 2320/0285* (2013.01); *G09G 2320/0295* (2013.01); *G09G 2320/041* (2013.01); *G09G 2320/043* (2013.01); *G09G 2320/045* (2013.01)

(58) Field of Classification Search
CPC ...... G06F 3/0416; G06F 3/044; G06F 1/3262; G06F 1/3215; G06F 2203/04101
See application file for complete search history.

(56) References Cited

U.S. PATENT DOCUMENTS

2013/0321361 A1    12/2013  Lynch et al.
2015/0161942 A1     6/2015  Chaji et al.
2015/0379940 A1    12/2015  Kishi

FOREIGN PATENT DOCUMENTS

WO          2014174472 A1     10/2014

OTHER PUBLICATIONS

International Search Report and Written Opinion for PCT Application No. PCT/US2017-049767 dated Nov. 20, 2017, 23 pgs.

*Primary Examiner* — Shaheda A Abdin
(74) *Attorney, Agent, or Firm* — Fletcher Yoder PC (57) ABSTRACT

Devices, storage media, and methods for compensating for aging and temperature variations using dual-loop compensation are provided. The compensating for temperature and aging variations of one or more pixels of the display using a coarse scan loop updated at a faster rate. Compensation also includes compensating for aging variations of the one or more pixels of the display using a fine scan loop updated at a slower rate.

20 Claims, 10 Drawing Sheets

DUAL-LOOP DISPLAY SENSING FOR COMPENSATION

CROSS REFERENCE TO RELATED APPLICATIONS

This application claims the benefit of U.S. Provisional Application No. 62/396,538, filed on Sep. 19, 2016, the contents of which are herein expressly incorporated by reference for all purposes.

BACKGROUND

The present disclosure relates generally to techniques for correcting for thermal variation of a display after or during a power cycle.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Artifacts may appear in a display due to a thermal profile, aging, and/or other device characteristic of a display panel, such as an organic light emitting diode (OLED) panel. Sensing may be used to correct these artifacts, but sensing takes some time possibly causing display of the artifacts for some time. External compensation utilizes feedback loops to a processor external to the display panel to compensate for the device characteristics variations. Multiple variations (e.g., temperature-change-induced variation and aging-induced variation) may coexist in a display life cycle. However, external compensation with a single loop may only fully address one contributing factor to display artifacts thereby improperly compensating or not compensating for other factors and the overall artifacts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Devices, storage media, and methods for compensating for aging and temperature variations using dual-loop compensation are provided. The compensating for temperature and aging variations of one or more pixels of the display using a coarse scan loop updated at a faster rate. Compensation also includes compensating for aging variations of the one or more pixels of the display using a fine scan loop updated at a slower rate. These compensation loops handle different aspects of variations. For example, the fast loop, as a coarse scan, may handle low-spatial varying temperature and aging variations, and the slow loop may handle high-spatial varying aging variations.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As previously discussed, pixels may vary when a driving current/voltage is applied under variable conditions, such as different temperatures or different online times of different pixels in the display. External compensation using one or more processors may be used to compensate for these variations. During a scan, these variations of the display are scanned using test data, and the results are provided to image processing circuitry external to the display. Based on the sensed variations of the pixels, the image processing circuitry adjusts the image data before it is provided to the display. When the image data reaches the display, it has been compensated in advance for the expected display variations based on the scans.

However, the compensation loops used to compensate for variations may not be capable of fully compensating for more than a single factor (e.g., temperature, aging). Dual-loop compensation may be used to apply compensation for multiple variation types. However, loops directed to different classifications of variation may utilize filtering or may not run simultaneously. Instead, the dual-loop compensation scheme may utilize a fast loop and a slow loop.

The fast loop is updated rapidly to cover variations with high temporal variations. The fast loop may also be populated with low-spatial variance scans to handle low-spatial variations, such as a generally broad area of aging of pixels (e.g., low-spatial aging variations) and temperature variations. The fast loop will also the low-spatial aging variations even though the low-spatial aging variations may have a relatively low frequency of variation.

The slow loop may handle aging variations that are not handled by the fast loop. Specifically, the slow loop may be updated much slower than the fast loop and with a higher spatial frequency (e.g., finer granularity) than the fast loop. Thus, the slow loop will handle aging that has a low-temporal frequency and a high spatial aging variations.

Since the variations that are picked up the fast loop and the slow loop, their compensations may be applied independently without complicated processing between the calculated compensations. These compensations may be added together before application to image data and/or may be applied to image data compensation settings independently.

Figure 1:
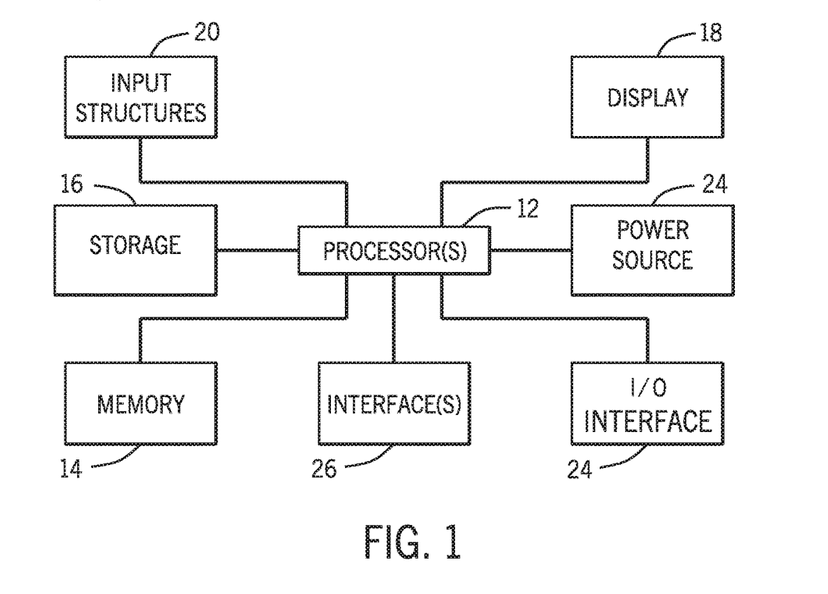
FIG. 1 is a schematic block diagram of an electronic device including a display, in accordance with an embodiment.

With the foregoing in mind and referring first to FIG. 1, an electronic device 10 according to an embodiment of the present disclosure may include, among other things, one or more processor(s) 12, memory 14, nonvolatile storage 16, a display 18, input structures 20, an input/output (I/O) interface 22, a power source 24, and an interface 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

In the electronic device 10 of FIG. 1, the processor(s) 12 and/or other data processing circuitry may be operably coupled with the memory 14 and the nonvolatile storage 16 to perform various algorithms. Such programs or instructions, including those for executing the techniques described herein, executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and/or optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels.

The input structures 20 of the electronic device 10 may enable a user to interact with the electronic device 10 (e.g., pressing a button to increase or decrease a volume level, a camera to record video or capture images). The I/O interface 22 may enable electronic device 10 to interface with various other electronic devices. The I/O interface 22 may include various types of ports that may be connected to cabling. These ports may include standardized and/or proprietary ports, such as USB, RS232, Apple's Lightning® connector, as well as one or more ports for a conducted RF link.

As further illustrated, the electronic device 10 may include a power source 24. The power source 24 may include any suitable source of power, such as a rechargeable lithium polymer (e.g., Li-poly) battery and/or an alternating current (e.g., AC) power converter. The power source 24 may be removable, such as a replaceable battery cell.

The interface(s) 26 enable the electronic device 10 to connect to one or more network types. The interface(s) 26 may also include, for example, interfaces for a personal area network (e.g., PAN), such as a Bluetooth network, for a local area network (e.g., LAN) or wireless local area network (e.g., WLAN), such as an 802.11x Wi-Fi network or an 802.15.4 network, and/or for a wide area network (e.g., WAN), such as a 3rd generation (e.g., 3G) cellular network, 4th generation (e.g., 4G) cellular network, or long term evolution (e.g., LTE) cellular network. The interface(s) 26 may also include interfaces for, for example, broadband fixed wireless access networks (e.g., WiMAX), mobile broadband Wireless networks (e.g., mobile WiMAX), and so forth.

Figure 2:
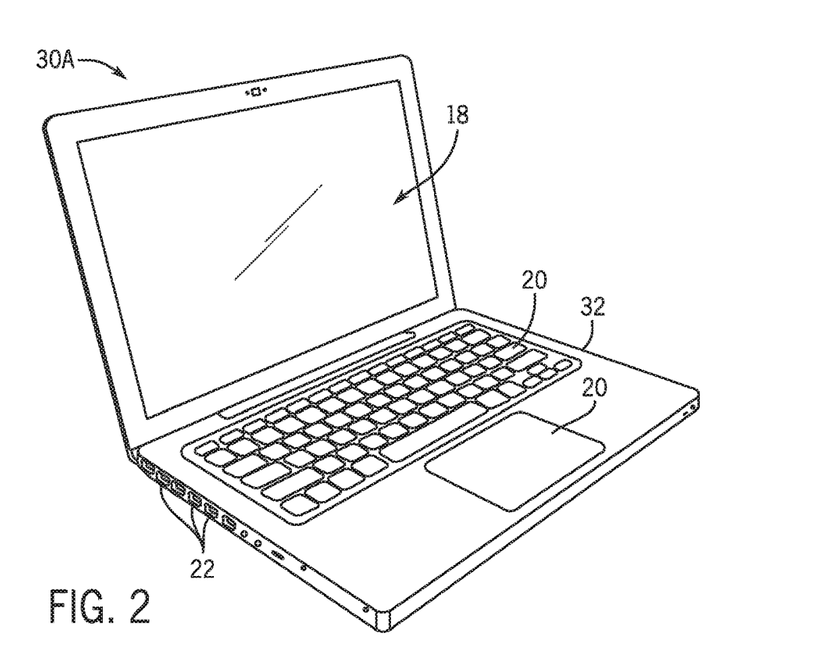
FIG. 2 is a perspective view of a notebook computer representing an embodiment of the electronic device of FIG. 1, in accordance with an embodiment.
Figure 3:
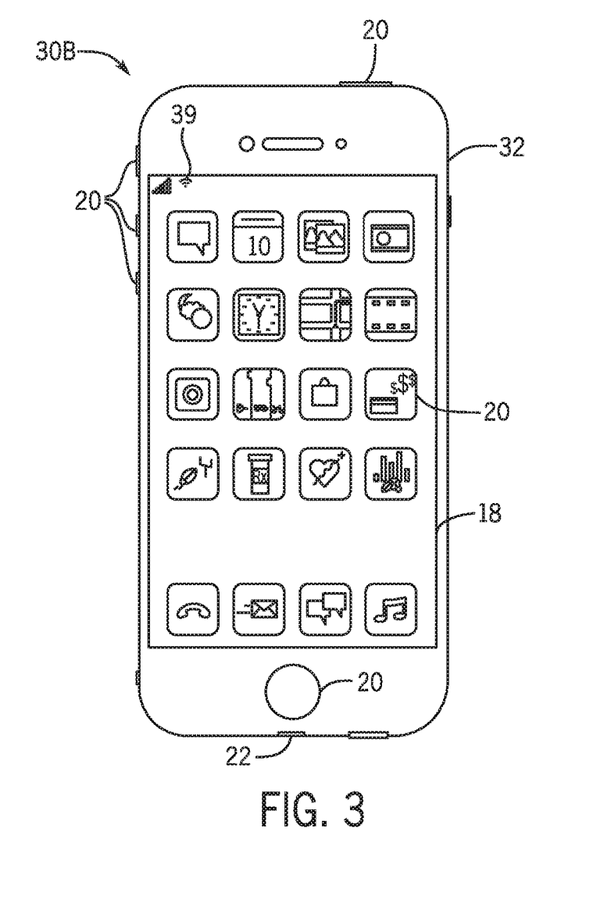
FIG. 3 is a front view of a hand-held device representing another embodiment of the electronic device of FIG. 1, in accordance with an embodiment.
Figure 4:
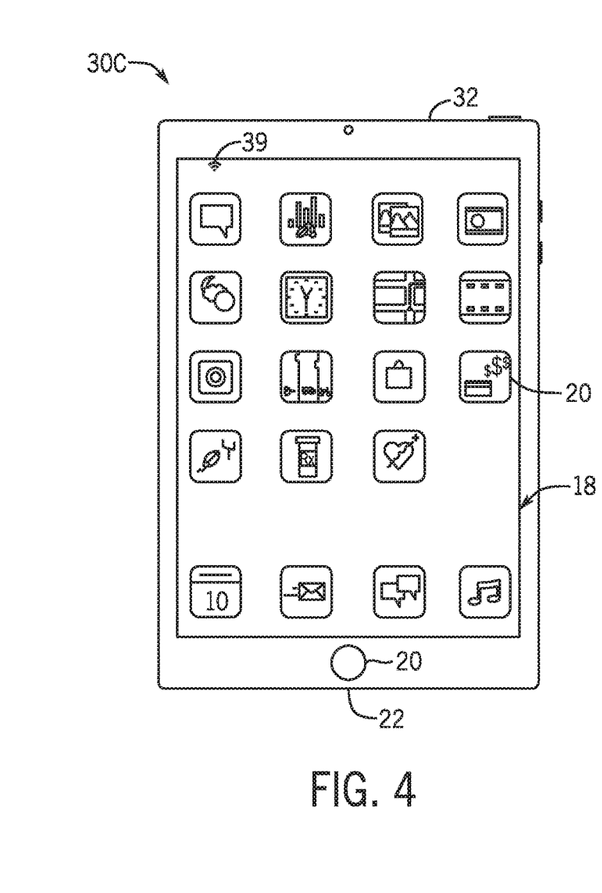
FIG. 4 is a front view of another hand-held device representing another embodiment of the electronic device of FIG. 1, in accordance with an embodiment.
Figure 5:
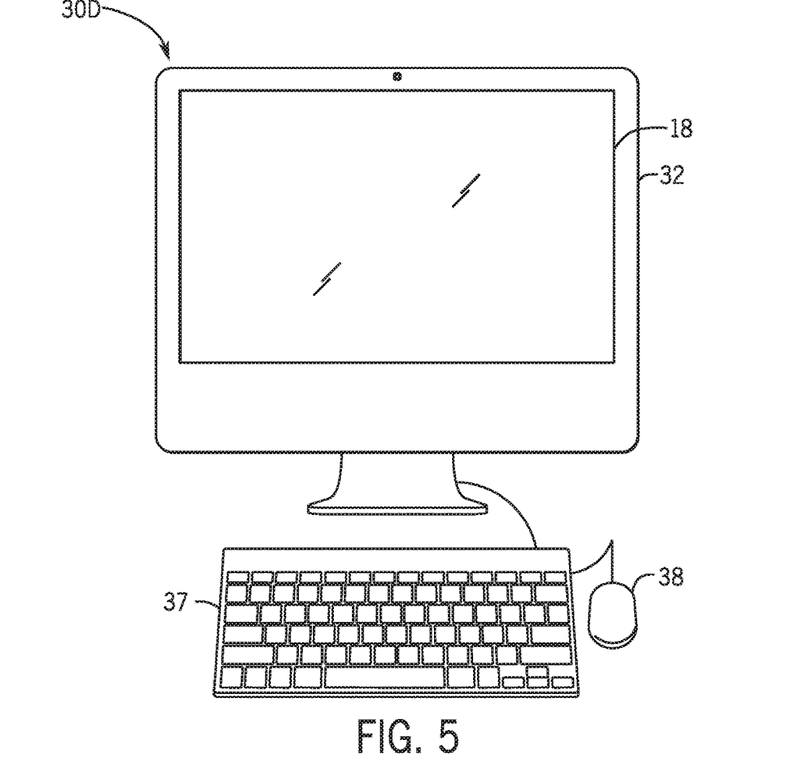
FIG. 5 is a front view of a desktop computer representing another embodiment of the electronic device of FIG. 1, in accordance with an embodiment.
Figure 6:
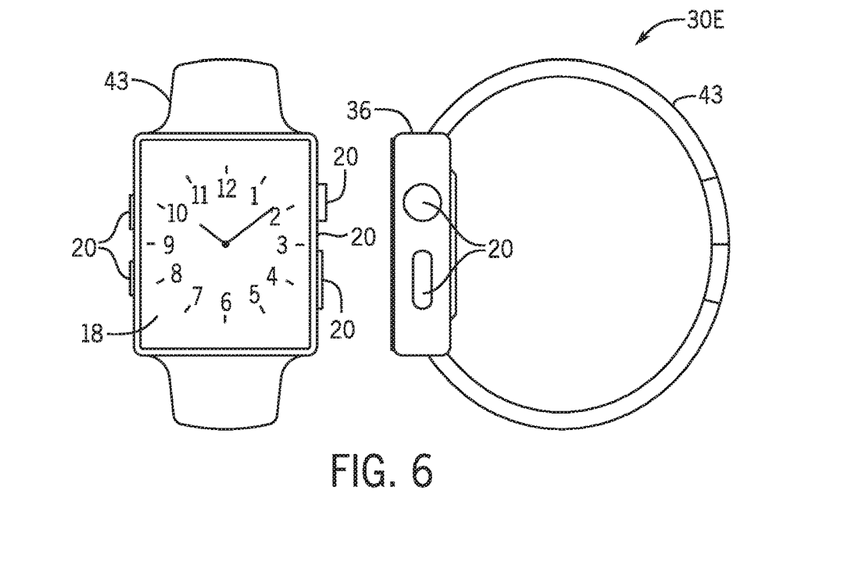
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG.6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 20, and ports of the I/O interface 22. In one embodiment, the input structures 20 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 30B may represent, for example, a portable phone, a media player, a personal data organizer, a handheld game platform, or any combination of such devices. By way of example, the handheld device 30B may be a model of an iPod® or iPhone® available from Apple Inc. of Cupertino, Calif.

The handheld device 30B may include an enclosure 32 to protect interior components from physical damage and to shield them from electromagnetic interference. The enclosure 32 may surround the display 18, which may display indicator icons 39. The indicator icons 39 may indicate, among other things, a cellular signal strength, Bluetooth connection, and/or battery life. The I/O interfaces 22 may open through the enclosure 32 and may include, for example, an I/O port for a hard wired connection for charging and/or content manipulation using a connector and protocol, such as the Lightning connector provided by Apple Inc., a universal serial bus (e.g., USB), one or more conducted RF connectors, or other connectors and protocols.

The illustrated embodiments of the input structures 20, in combination with the display 18, may allow a user to control the handheld device 30B. For example, a first input structure 20 may activate or deactivate the handheld device 30B, one of the input structures 20 may navigate user interface to a home screen, a user-configurable application screen, and/or activate a voice-recognition feature of the handheld device 30B, while other of the input structures 20 may provide volume control, or may toggle between vibrate and ring modes. Additional input structures 20 may also include a microphone that may obtain a user's voice for various voice-related features, and a speaker to allow for audio playback and/or certain phone capabilities. The input structures 20 may also include a headphone input (not illustrated) to provide a connection to external speakers and/or headphones and/or other output structures.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 32 may be provided to protect and enclose internal components of the computer 30D such as the display 18. In certain embodiments, a user of the computer 30D may interact with the computer 30D using various peripheral input devices, such as a keyboard 37 or mouse 38, which may connect to the computer 30D via an I/O interface 22.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., pedometer, accelerometer, heart rate monitor), or other device by another manufacturer. The display 18 of the wearable electronic device 30E may include a touch screen (e.g., LCD, an organic light emitting diode display, an active-matrix organic light emitting diode (e.g., AMOLED) display, and so forth), which may allow users to interact with a user interface of the wearable electronic device 30E.

Figure 7:
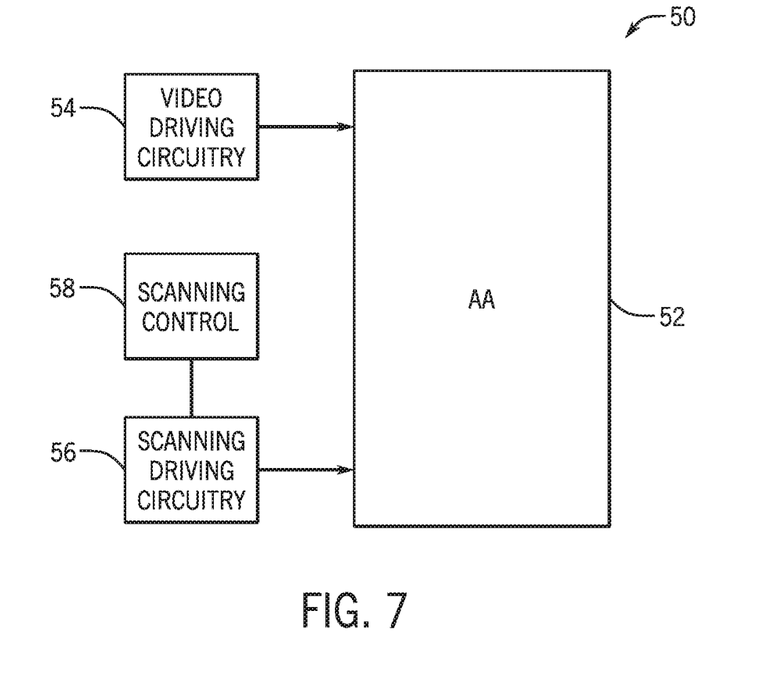
FIG. 7 is a schematic view of a display system that includes an active area and a driving circuitry for display and sensing modes, in accordance with an embodiment.
Figure 8:
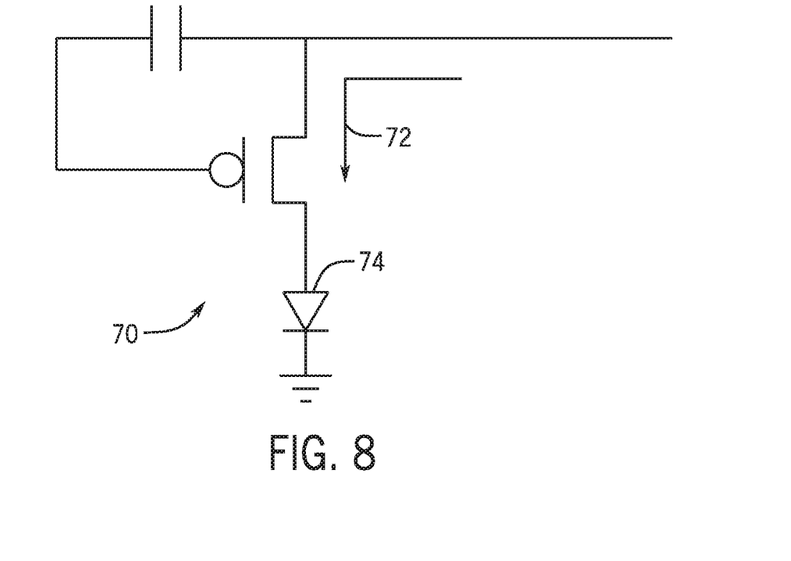
FIG. 8 is a schematic view of a pixel circuitry of the active area of FIG. 7, in accordance with an embodiment.

FIG. 7 illustrates a display system 50 that may be included in the display 18 be used to display and scan an active area 52 of the display 18. The display system 50 includes video driving circuitry 54 that drives circuitry in the active area 52 to display images. The display system 50 also includes scanning (or sensing) driving circuitry 56 that drives circuitry in the active area 52. In some embodiments, at least some of the components of the video driving circuitry 54 may be common to the scanning driving circuitry 56. Furthermore, some circuitry of the active area may be used both for displaying images and scanning. For example, pixel circuitry 70 of FIG. 8 may be driven, alternatingly, by the video driving circuitry 54 and the scanning driving circuitry 56. When a pixel current 72 is submitted to an organic light emitting diode (OLED) 74 from the video driving circuitry 54 and the scanning driving circuitry 56, the OLED 74 turns on. However, emission of the OLED 74 during a scanning phase may be relatively low, such that the scan is not visible while the OLED 74 is being sensed. In some embodiments, the display 18 may include LEDs or other emissive elements rather than the OLED 74. To control scans during the scanning mode, a scanning controller 58 of FIG. 7 may control scanning mode parameters used to drive the scanning mode via the scanning driving circuitry 56. The scanning controller 58 may be embodied using software, hardware, or a combination thereof. For example, the scanning controller 58 may at least be partially embodied as the processors 12 using instructions stored in memory 14 or in communication with the processors 12.

Figure 9:
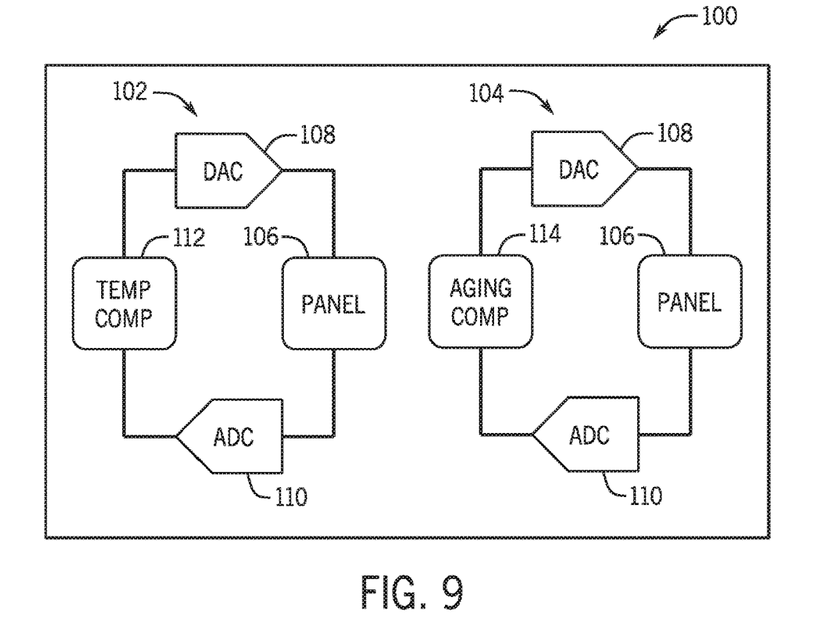
FIG. 9 is a block diagram of a dual-loop compensation scheme with two independent loops that run at different times, in accordance with an embodiment.

The processors 12 are in communication with the scanning controller 58 and/or the scanning driving circuitry 56. The processors 12 compensate image data for results from scanning using the scanning driving circuitry 56 using dual-loops of processing. For example, FIG. 9 illustrates a flow diagram for a dual-loop scheme that includes a first loop 102 and a second loop 104. The first loop may be a temperature compensation loop that runs during a first period during which the display 18 undergoes temperature changes, such as while the electronic device 10 is in use. The second loop may 104 be an aging compensation loop that runs during a second period when the first loop 102 is not running. For example, the second loop 104 could run when the electronic device is in a standby state, such as a power off state and/or charging state.

In the first loop 102, a panel 106 receives test data from a digital-to-analog-converter (DAC) 108 that sends test data to a panel 106 for sensing characteristics of pixels in the panel 106. Sensed data returning from the panel 106 are submitted to an analog-to-digital converter (ADC) 110. The digital sensed data is sent to processors 12 and compensated using temperature compensation logic 112 running on the processors 12. Specifically, any temperature fluctuations causing a change in brightness of resulting pixels. The temperature compensation logic 112 compensates for variations that would occur from the temperature variations by applying inverted versions of the temperature changes to image data to reduce or eliminate fluctuations from transmitted image data.

In the second loop 104, the panel 106 receives test data from the digital-to-analog-converter (DAC) 108 that sends test data to the panel 106 for sensing characteristics of pixels in the panel 106. Sensed data returning from the panel 106 are submitted to the analog-to-digital converter (ADC) 110. The digital sensed data is sent to processors 12 and compensated using aging compensation logic 114 running on the processors 12. Specifically, since the electronic device 10 may be on standby, results of the sensed data may include only aging data without temperature variation effects. The aging compensation logic 114 compensates for variations that would occur from the aging of circuitry of the panel 106 variations by applying inverted versions of the temperature changes to image data to reduce or eliminate fluctuations from transmitted image data.

As illustrated, there is no interaction between the first loop 102 and the second loop 104. By allowing the first loop 102 and the second loop 104 to operate independently, implementation may be more simple and compensation may be generally less complex. However, aging data may be collected at a relatively low collection speed and corresponds to a relatively high visibility risk.

Figure 10:
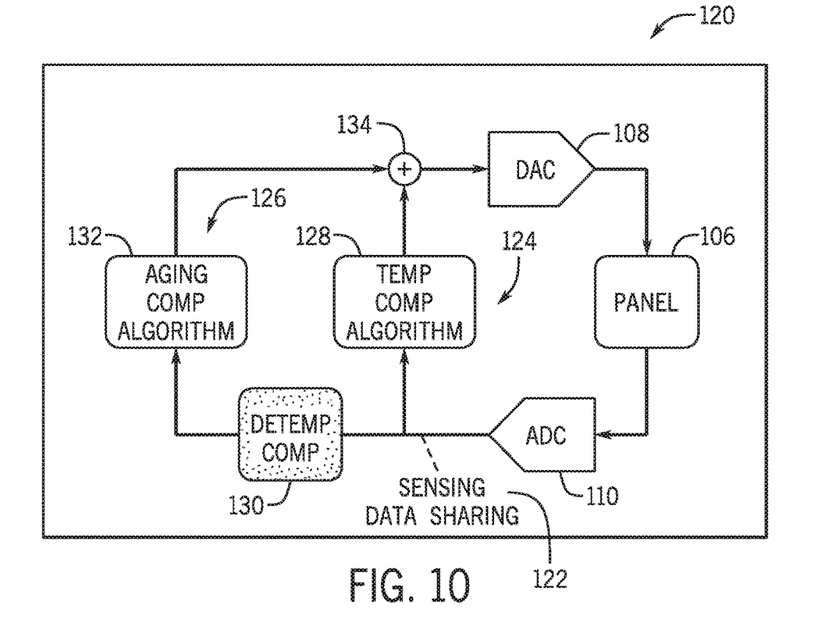
FIG. 10 is a block diagram of a dual-loop compensation scheme with an aging loop and a temperature loop, in accordance with an embodiment.

FIG. 10 is schematic diagram of a dual-loop scheme 120 that includes sharing sensed data 122 between an temperature compensation loop 124 and an aging compensation loop 126 that operate at the same time. The temperature compensation loop 124 receives the sensed data and processes the sensed data 122 using the sensed data to reduce potential variations based on the sensing data 122. The sensed data 122 is also submitted to the aging loop 126 in total, but the sensed data 122 first has temperature aspects filtered out. For example, the sensed data 122 may use de-temperature compensation logic 130 to filter out temperature aspects. One method of performing such filtration includes averaged temperature effect out of the sensed data 122. The adjustments using the temperature compensation logic 128 and the aging compensation logic 126 are combined together using an accumulator 134 for driving images and for further testing using the DAC 108. An advantage of the scheme 120 is that all aging information goes into the aging loop 126. However, all temperature variation is sensed by the aging loop 126 unless the temperature data is filtered out. To filter out the temperature data, the de-temperature compensation logic 130 uses a relatively long time to statistically average the temperature effect out.

Figure 11:
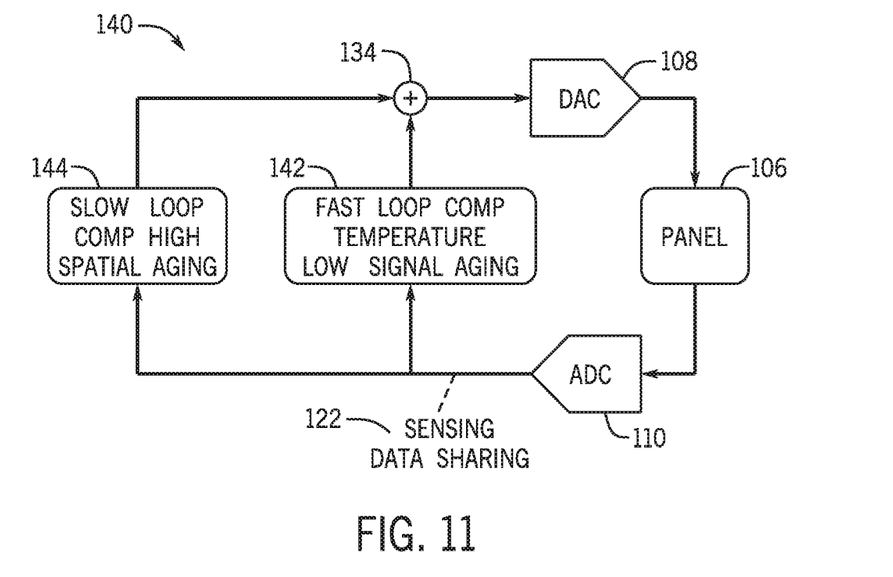
FIG. 11 is a flow diagram of a dual-loop compensation scheme with a slow loop and a fast loop, in accordance with an embodiment.
Figure 12:
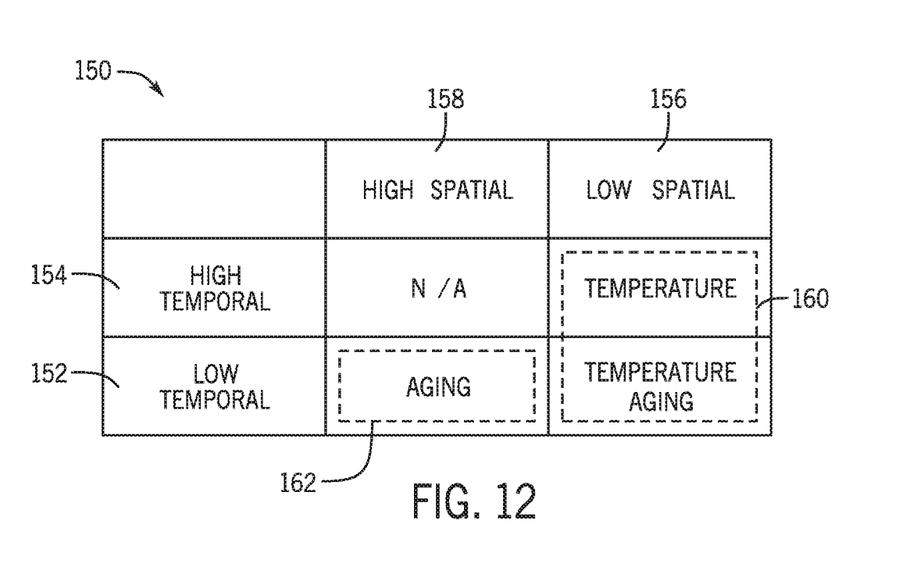
FIG. 12 is a graph of fast loop and slow loop interaction with relation to temporal frequency and spatial frequencies, in accordance with an embodiment.

FIG. 11 illustrates an embodiment of a dual-loop scheme 140 that includes fast loop compensation 142 and slow loop compensation 144 that run simultaneously rather than differentiating between temperature and aging or running different temperature and aging loops at different times. For example, the "fast" loop may run to handle variations corresponding to low spatial frequency variations that are run more frequently. The fast loop handles everything that falls within its bandwidth. The "slow" loop may run to handle remaining variations. An accumulator 146 combines the results of the fast and slow loop compensation 142 and 144. FIG. 12 illustrates how temperature variations and aging variations are handled using the fast loop compensation 142 and the slow loop compensation 144. Specifically, a graph 150 is illustrated with a division of variations in sensing data in spatial and temporal distributions. As illustrated, aging variations generally take a relatively high amount of time thus include only low temporal variations 152 while temperature may include low temporal variations 152 and high temporal variations 154 due to slow temperature changes (e.g., gradual heating) or fast temperature changes (e.g., internal heating by electronic circuitry).

Temperature also varies little from pixel-to-pixel but rather only fluctuates with a relatively low spatial frequency 156 of variance. However, aging may vary from pixel-to-pixel in a high spatial frequency 158 of variance since adjacent pixels may have differing levels of usage. Aging may also vary in a low spatial frequency 156 due to groups of pixels (e.g., whole display, a notification area of a user interface, etc.) that are used substantially together. Neither aging nor temperature has a high temporal frequency 154 variation and high spatial frequency 158. To cover aging and compensation, if a fast loop 160 has a low spatial frequency or coarse scanning pattern in sensing scans and/or compensation, the slow loop 162 may apply a high spatial frequency or more fine tuned pattern at less frequent intervals. This dual-loop scheme 140 results in aging and temperature variations being compensated for properly. Furthermore, the dual-loop scheme 140 may be deployed without filtering to remove temperature data from aging data or vice versa since the slow loop 162 only handles high spatial frequency, low temporal variation aging that is not handled by the fast loop 160.

Figure 13:
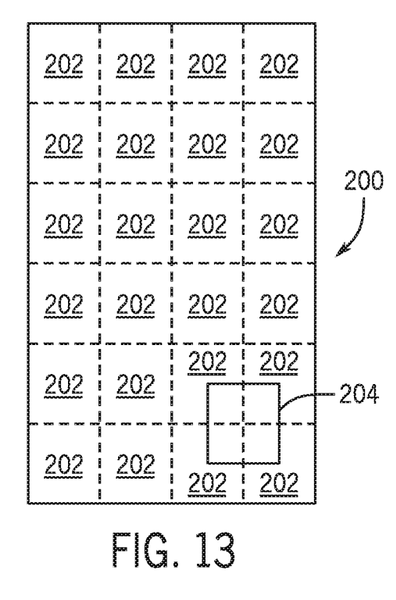
FIG. 13 is a schematic view of a screen of a display using a coarsened fast loop to have various regions with a display area spanning multiple regions, in accordance with an embodiment.
Figure 14A:
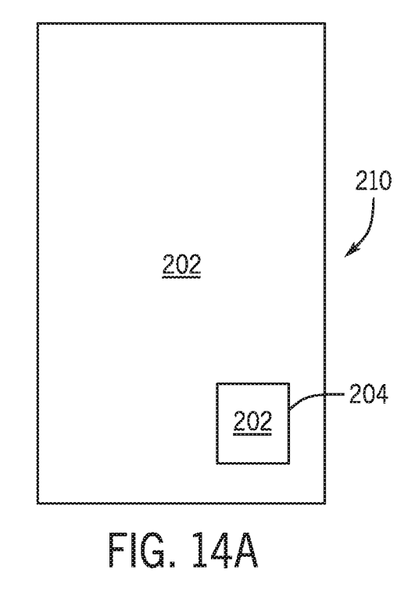
FIG. 14A illustrates a screen of a display illustrating an artifact resulting from only compensating using the fast loop, in accordance with an embodiment.
Figure 14B:
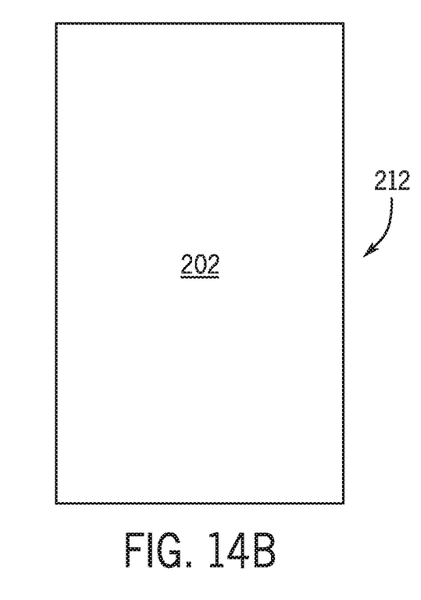
FIG. 14B illustrates a screen of a display illustrating a screen resulting from compensating using the fast loop and the slow loop, in accordance with an embodiment.

Furthermore, using only a single loop with low spatial variation would not properly address all issues arising from aging and temperature variations. FIG. 13 illustrates an example of a screen 200 logically divided into multiple regions 202. The values for all sensing data in each region 202 may be spatially averaged and/or sampled with each pixel being treated the same within the same region 202. Although the regions are shown consistent in size and location, in some embodiments, the region sizes and/or locations may vary during operation of the display. Regardless, when a portion of the screen 200 includes an area 204 that ages differently. For example, the area 204 may include pixels that undergo more heavy use than surrounding pixels, such as portions of a notification area, a more heavily used portion of the screen in a video game, icons, and/or other continuously displayed images. When the display 18 attempts to display an image, such as a gray screen 210 of FIG. 14A or a gray screen 212 of FIG. 14B. One or more artifacts 214 may be displayed if only a single compensation loop having a coarse-grained low-spatial frequency pattern as shown in FIG. 14A. However, if a low temporal finegrained analysis is used to compensate for variations, the artifacts are not present in the screen 212 of FIG. 14B. The artifacts 214 may appear around an edge of the area 204 because the averaging due to low spatial variance will correct inside and outside the area 204, but the boundary between the pixels inside and outside the area 204 are not properly addressed causing the artifacts 214 to appear at the boundaries of the area 204. Such variations are addressed using the slow loop compensation with fine tuned granularity that will address the aging differences by for high spatial frequency. For example, the slow loop may be compensated from pixel-to-pixel or in small groups relative to group sizing used for the fast loop.

Figure 15:
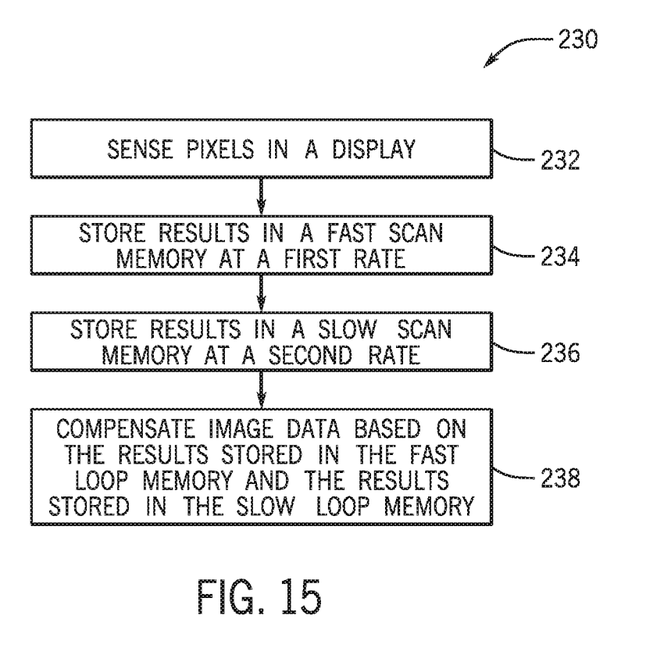
FIG. 15 illustrates a flow diagram of a process for compensating for temperature and aging variations using a fast loop and a slow loop, in accordance with an embodiment.

FIG. 15 illustrates a process 230 that may be employed by the processors 12 to compensate for fluctuations due to temperature and aging using a fast loop and a slow loop. The processors 12 cause pixels of a display to be sensed (block 232). For example, the processors 12 may use the scanning driving circuitry 56. The processors 12 store results from the scan in a first scan memory at a first rate (block 234). The first rate may be relatively low with a frequency of more than once per second, once every couple seconds, once every couple minutes, once every ten minutes, or other periods of high temporal frequency. In other words, the first scan memory stores scan data using a high temporal rate. The data in the first scan memory may include a coarse scan with low spatial frequency that is obtained by sampling only a portion of a region rather than each pixel and/or by spatially averaging sensing data of multiple pixels. In some embodiments, the spatial averaging may be performed by sensing multiple pixels at once thereby averaging out sensing data. Additionally or alternatively, the spatial averaging may be performed by mathematically averaging sensed data using the processors 12 or other circuitry and/or logic.

The processors 12 also store results from the scans in a second scan memory at a second rate (block 236). The second rate may be low relative to the first rate with a frequency of scan (or at least storage of scans) being stored only once every several minutes, once an hour, once per several hours, or other periods of low temporal rates.

Using the sensing results stored in the first scan memory and the second scan memory, the processors 12 compensate image data (block 238). Compensation for the variations detected using each loop may be compensated for in series with the fast loop or the slow loop compensation performed first with the other performed after. For example, the fast loop may be compensated for with the slow loop being compensated after or vice versa. This sequential compensation is feasible for the dual-loop scheme since each loop addresses non-overlapping areas of concern. Additionally or alternatively, a summed compensation may be applied. For example, if the slow loop indicates that a pixel's driving level (e.g., current or voltage) should be increased by a certain amount due to aging while the fast loop indicates that the pixel's driving level should be decreased by a certain amount. The compensations may be compounded together by subtracting the values from each other.

Figure 16:
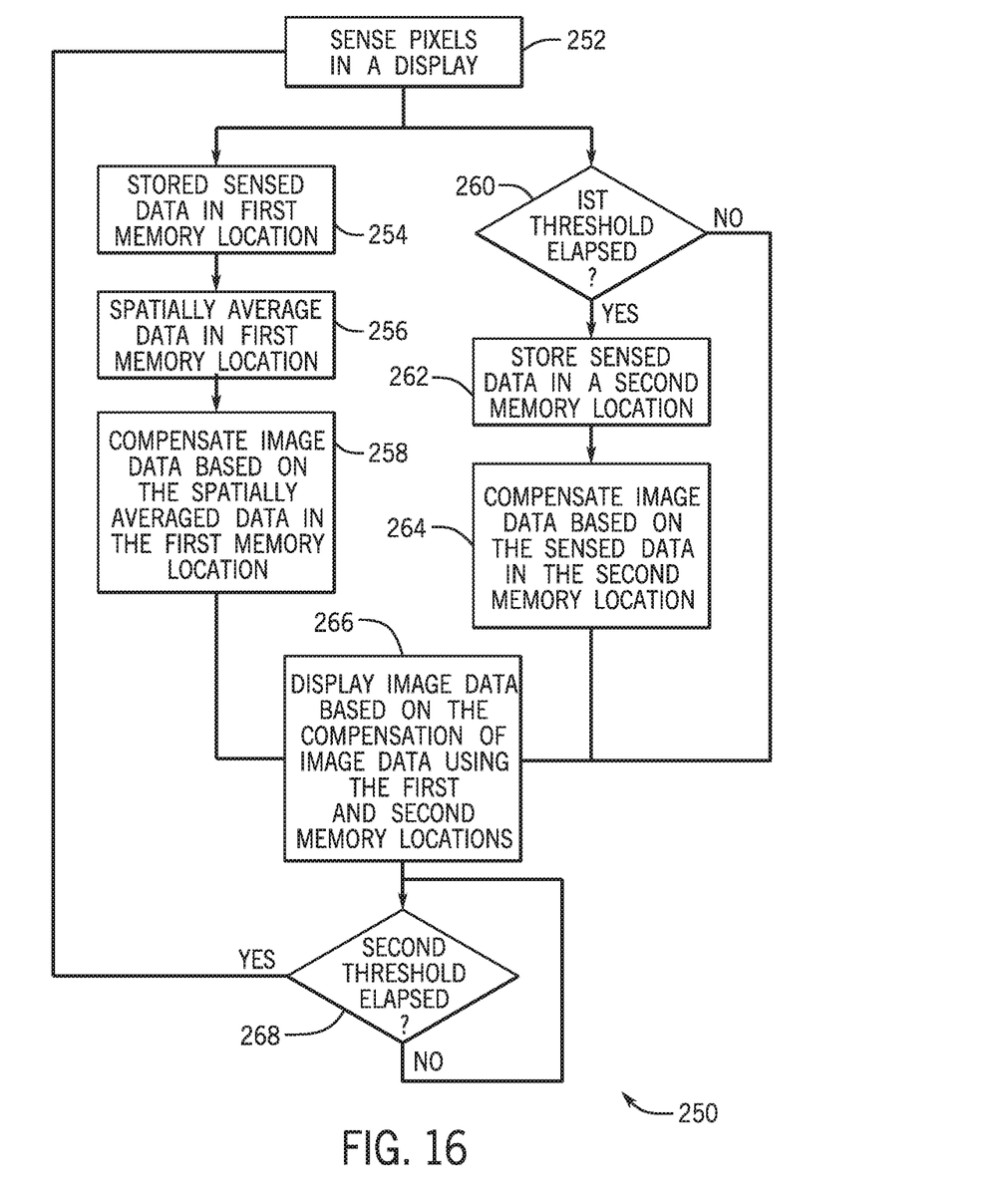
FIG. 16 illustrates a flow diagram of a process for compensating using a fast loop using spatially averages of scan data, in accordance with an embodiment.

FIG. 16 illustrates a detailed process 250 that may be used by the processors 12 to compensate for temperature and aging variations using dual-loop analysis. The processors 12 cause the scanning driving circuitry 56 to sense values returned from one or more pixels based on input data (block 252). For example, the input data may cause low level emission from the one or more pixels and receive return data from the one or more pixels indicating a temperature and/or aging of the one or more pixels. In some embodiments, some scans may include a scan of every pixel in the display 18 while other scans may include only some of the pixels of the display 18 as a sample.

Analysis of the sensed data is performed using two loops. In a "fast" loop, the sensed data is stored in a first memory location (block 254). Before or after storage, the sensed data in the first memory location is spatially averaged to create a coarse scan (block 256). As previously discussed, this coarse scan (sampled at a high temporal rate) results in the fast loop capturing variations related to low spatial aging and temperature of high and low temporal frequency variations. These variations are compensated for by inverting expected image fluctuations in the image data where the expected fluctuations are based on the spatially averaged data in the first memory location.

In the second loop or the "slow" loop, the processors 12 determine whether a first threshold has elapsed since the last scan of the slow loop (block 260). For example, this threshold may be several minutes to several hours of time. If the threshold has not elapsed, no new data is sampled into the slow loop and a previous compensation using the slow loop is maintained. However, if the duration has elapsed, the processors 12 store the sensed data in a second memory location (block 262). In some embodiments, the first threshold may be forgone if no data is stored in the second memory location after start up of the electronic device 10. As previously noted, the data in the second memory may have a fine grain resolution (e.g., high spatial frequency) that captures variations due to high spatial frequency aging of pixels or small groups of pixels. The compensations from the first and second loop may be mathematically combined using an accumulator and/or each may be applied directly to the image data independently.

Once compensations using the fast and slow loops have been applied to image data, the compensated image data is displayed based on the compensations using the first and second memory locations (block 266).

The rescan process is repeated once a second threshold elapses (block 268). The second threshold may be used to control how often the fast loop obtains data. Therefore, the second threshold may be less than a second, a second, more than a second, a few minutes, or any value less than the first threshold. If the second threshold has not elapsed, current compensations are maintained, but if the second threshold has elapsed, a new scan is begun and at least fed to the fast loop. Since a single set of scan results may be used for both the fast loop and the slow loop, the loops may share scan data (prior to spatial averaging in the fast loop). Thus, the second threshold determines when to begin a new scan and the first threshold determines whether the new scan is submitted to the slow loop or only the fast loop. Additionally or alternatively, the first threshold may independently begin a new scan for the slow loop when the first threshold has elapsed.

Figure 17:
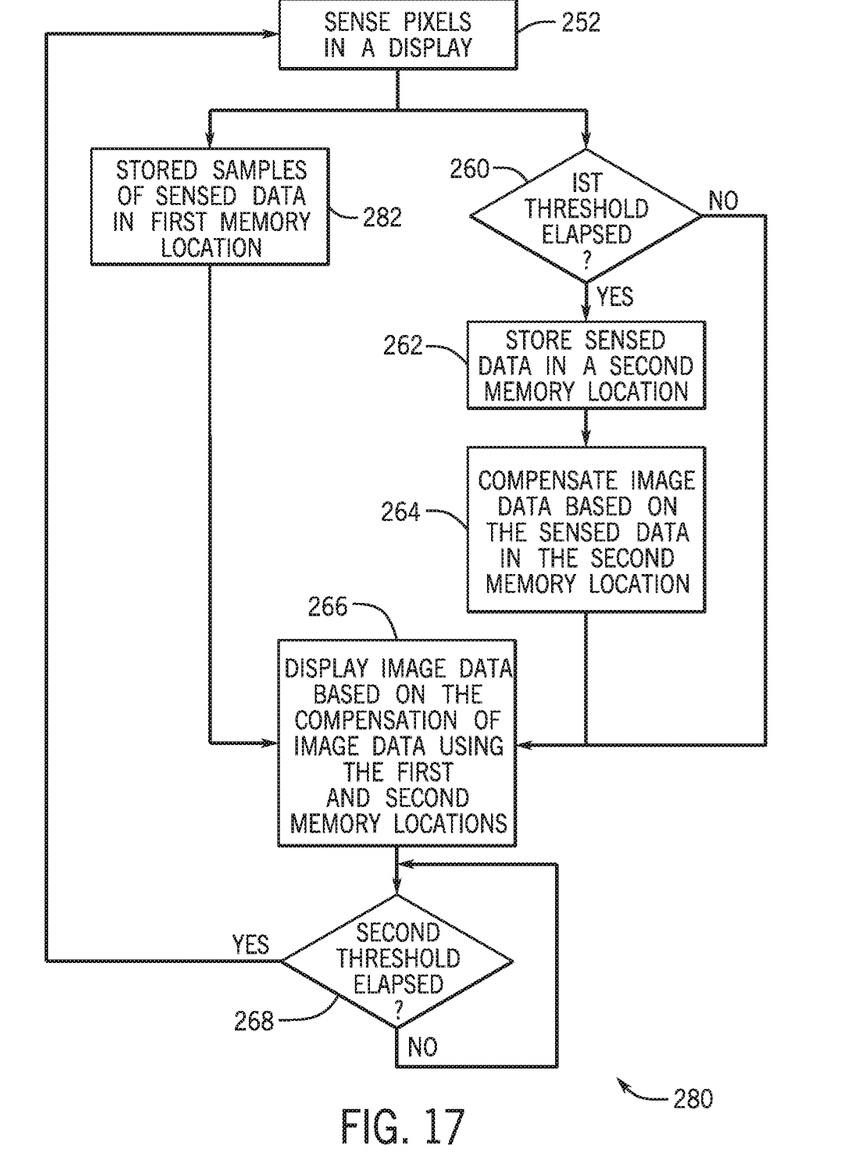
FIG. 17 illustrates a flow diagram of a process for compensating using a fast loop using sensed data sampling of less than all of the pixels of a display, in accordance with an embodiment.

As previously noted, the fast loop may use a sample of data rather than spatially averaged values. FIG. 17 illustrates a process 280 that may be used by the processors 12 to compensate for temperature and aging variations using dual-loop analysis. The process 280 is similar to the process 250. However, the process 280 utilizes sampling rather than spatial averaging in the fast loop. Specifically, the processors 12 store samples of sensed data in the first memory location (block 282). For example, if a full scan is produced, only a portion of the sensed data may be stored in the first memory location. Alternatively, a partial scan may be completed scanning only the pixels that are to be used for the low spatial variation fast scan. Regardless, the sampled pixel may vary in each scan to average individual pixel characteristics.

Furthermore, as previously noted, the processors 12 cause sensing of pixels (block 252). However, unlike sensing in the process 280, some scans of the display 18 may include sensing only a portion of the pixels of the display rather than all of the pixels of the display 18. For example, when a threshold period has elapsed for the second threshold, a scan may be initiated, but a scan type may depend upon whether a threshold period has elapsed for the first threshold. If the second first threshold has elapsed, the scan may be complete for every pixel to generate a fine scan with a high spatial frequency pattern, but if the second threshold has elapsed, the scan may include only the pixels that are to be included in the first memory rather than sampling a full scan.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
   a display including:
      one or more pixels configured to:
         in a display mode, display images; and
         in a pixel sense mode, provide operational information about operation of the one or more pixels; and
      sensing driving circuitry that drives sensing of the one or more pixels of the display during the pixel sense mode; and
   at least one processor configured to:
      cause the sensing driving circuitry to scan at least a portion of the one or more pixels to receive sensed data;
      store a coarser version of the sensed data in a first memory location;
      determine if a slow loop threshold period has elapsed since a last previous slow scan;
      if the slow loop threshold period has elapsed since a last previous slow scan, store the sensed data in a second memory location;
      compensate image data using the coarser version of the sensed data and the sensed data in the second memory location; and
      cause the display to display the compensated data.

2. The electronic device of claim 1, wherein storing the coarser version comprises:
   spatially averaging the sensed data to generate the coarser version of the sensed data; and
   storing the spatially averaged sensed data as the coarser version of the sensed data.

3. The electronic device of claim 1, wherein storing the coarser version comprises sampling only a portion of the sensed data from corresponding a plurality of regions each containing at least one of the one or more pixels.

4. The electronic device of claim 1, wherein scanning at least the portion of the one or more pixels comprises:
   determining whether a fast loop threshold period has elapsed since a last previous scan, wherein the slow loop threshold period is longer than the fast loop threshold period; and
   when the fast loop threshold period has elapsed since the last previous scan, rescanning the at least a portion of the one or more pixels to update the received sensed data.

5. The electronic device of claim 4, wherein scanning at least the portion of the one or more pixels comprises:
   when the fast loop threshold period has elapsed since the last previous scan and the slow loop threshold period has not elapsed since the last previous slow scan, the scan includes a smaller number of the one or more pixels than when the fast loop threshold period has elapsed since the last previous scan and the slow loop threshold period has elapsed since the last previous slow scan.

6. The electronic device of claim 4, wherein the fast loop threshold period is less than ten minutes.

7. The electronic device of claim 1, wherein the slow loop threshold period is greater than one hour.

8. The electronic device of claim 1, wherein compensation using the coarser version of the sensed data compensates for temperature variations and aging with low spatial frequency.

9. The electronic device of claim 1, wherein compensation using the sensed data in the second memory location compensates for pixel aging having a high spatial frequency between pixels.

10. The electronic device of claim 1, wherein a same sensed data value is used to store data in the first memory location and the second memory location.

11. The electronic device of claim 1, wherein compensate the image data comprises:
    mathematically combining compensations based on the coarser version of the sensed data with compensations based on the sensed data in the second memory location to form combined compensations; and
    compensating the image data with the combined compensations.

12. A method for compensating for aging and temperature variations in a display, comprising:
    using a first loop to determine a first set of compensations to compensate for a combination of aging and temperature variations of one or more pixels, wherein the first loop comprises scans with low-spatial frequency;
    using a second loop to determine a second set of compensations to compensate for aging variations of the one or more pixels, wherein the first loop comprises scans include low-temporal frequency and high-spatial frequency;
    compensating image data using the first set of compensations and the second set of compensations; and
    displaying the compensated image data.

13. The method of claim 12, wherein the first loop is performed more frequently than second loop.

14. The method of claim 12, wherein the high-spatial aging compensated for by the second loop comprise high-spatial aging of the one or more pixels.

15. The method of claim 12, wherein the combination of aging and temperature variations comprises low-spatial aging of one or more pixels and temperature variations of the one or more pixels.

16. The method of claim 12, low-spatial frequency of the first loop comprises coarser groups of the one or more pixels of the display.

17. The method of claim 16, wherein the coarser groups of the one or more pixels includes less all of the one or more pixels scanned in the scan.

18. The method of claim 16, comprising forming the coarser groups of the one or more pixels of the display by spatially averaging groups of the one or more pixels.

19. The method of claim 16, wherein the high-spatial frequency of the second loop comprises groups of the one or more pixels of the display smaller than the coarser groups.

20. A tangible, non-transitory, machine-readable storage medium storing one or more programs that are executable by one or more processors of an electronic device with a display, the one or more programs including instructions to:
   compensating for temperature and aging variations of one or more pixels of the display using a coarse scan updated at a first rate; and
   compensating for aging variations of the one or more pixels of the display using a fine scan updated at a second rate, wherein the first rate is faster than the second rate, and wherein compensating for temperature and aging variations of one or more pixels display using a coarse scan updated at a first rate and compensating for aging variations of the one or more pixels of the display using a fine scan updated at a second rate are performed concurrently.

* * * * *

UNITED STATES PATENT AND TRADEMARK OFFICE
CERTIFICATE OF CORRECTION

PATENT NO. : 10,209,551 B2
APPLICATION NO. : 15/677267
DATED : February 19, 2019
INVENTOR(S) : Hung Sheng Lin et al.

Page 1 of 1

It is certified that error appears in the above-identified patent and that said Letters Patent is hereby corrected as shown below:

In the Claims

Column 13, Line 11 (Claim 20) replace "compensating" with --compensate--.

Column 13, Line 14 (Claim 20) replace "compensating" with --compensate--.

Signed and Sealed this
Sixteenth Day of July, 2019

Andrei Iancu
*Director of the United States Patent and Trademark Office*